(12) United States Patent
Lindquist

(10) Patent No.: US 6,652,900 B2
(45) Date of Patent: Nov. 25, 2003

(54) METHOD AND PLANT FOR PRODUCING A STERILE MILK PRODUCT

(75) Inventor: Anders Lindquist, Helsingborg (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 198 days.

(21) Appl. No.: 09/883,247

(22) Filed: Jun. 19, 2001

(65) Prior Publication Data

US 2002/0012732 A1 Jan. 31, 2002

Related U.S. Application Data

(63) Continuation-in-part of application No. 09/709,419, filed as application No. PCT/SE98/00413 on Mar. 9, 1998, now Pat. No. 6,372,276, which is a continuation-in-part of application No. 09/446,270, filed as application No. PCT/SE98/01145 on Jun. 15, 1998, now Pat. No. 6,326,044.

(30) Foreign Application Priority Data

Mar. 14, 1997 (SE) .............................................. 9700928
Jun. 19, 1997 (SE) .............................................. 9702359

(51) Int. Cl.[7] .............................. A23C 3/02; A01J 11/10
(52) U.S. Cl. ........................... 426/522; 99/452; 99/456; 210/651; 426/491
(58) Field of Search .............................. 426/491, 495, 426/522, 580; 99/452, 456; 210/650, 651, 636

(56) References Cited

U.S. PATENT DOCUMENTS 3,233,964 A   2/1966   Skoldberg
3,973,048 A   8/1976   Sollerud (List continued on next page.)

FOREIGN PATENT DOCUMENTS

GB   2209919 A    5/1989
WO   WO86/01687   3/1986
WO   WO87/05469   9/1987

(List continued on next page.)

OTHER PUBLICATIONS

"8. Alternative Methods: Legal and Control Aspects" H. Glaeser, European Commission, Heat Treatments & Alternative Methods, Proceedings of the IDF Symposium held in Vienna (Austria) Sep. 6–8, 1995, pp. 438–447.
"Filter Out Bacteria", Dairy Foods® Mar. 1996, p. 55.
"Psychotrophs in Dairy Products: Their Effects and Their Control" Claude P. Champagne et al., Critical Reviews in Food Science and Nutrition, vol. 34, Issue 1, 1994, pp. 1–30.
"Dairy Technology", Food Science and Technology, Research Report 1988–89, pp. 96–105.

* cited by examiner

Primary Examiner—George C. Yeung
(74) Attorney, Agent, or Firm—Burns, Doane, Swecker & Mathis, L.L.P.

(57) ABSTRACT

A method and a plant for producing sterile milk which includes separating the raw milk into skim and cream portions, filtering the skim portion to form a first permeate and a first retentate, heat treating the first permeate, filtering the first retentate to form a second permeate and combining the second permeate with one or more of the raw milk, the milk portion or the cream portion. A second filter can have an effective pore size the same as or greater than that of a first filter. The cream portion can be standardized and heat treated, then remixed with the first permeate either before or after heat treatment of the first permeate to form a standardized milk product, which can be homogenized and packaged in aseptic containers. The process can yield at least 95 percent (e.g., 99.8% or more) of the skim milk portion into a usable milk product.

32 Claims, 10 Drawing Sheets

U.S. PATENT DOCUMENTS

| | | |
|---|---|---|
| 3,983,257 A | 9/1976 | Malmberg et al. |
| 4,175,141 A | 11/1979 | Adams, Jr. et al. |
| 4,340,479 A | 7/1982 | Pall |
| 4,515,823 A | 5/1985 | Kirshenmann |
| 4,560,567 A | 12/1985 | Rausing |
| 4,853,246 A | 8/1989 | Stevens |
| 4,876,100 A | 10/1989 | Holm et al. |
| 4,894,243 A | 1/1990 | Ahrné |
| 4,931,302 A | 6/1990 | Leshik et al. |
| 5,137,738 A | 8/1992 | Wynn |
| 5,256,437 A | 10/1993 | Degen et al. |
| 5,338,553 A | 8/1994 | Johnson et al. |
| 5,356,651 A | 10/1994 | Degen et al. |
| 5,401,523 A | 3/1995 | Degen et al. |
| 5,576,040 A | 11/1996 | Moller et al. |
| 5,591,469 A * | 1/1997 | Zettier ........................ 426/491 |
| 5,679,780 A | 10/1997 | Jensen et al. |
| 5,683,733 A | 11/1997 | Krabsen et al. |
| 5,935,632 A | 8/1999 | Larsen |
| 6,326,044 B1 * | 12/2001 | Lindquist ..................... 426/491 |

FOREIGN PATENT DOCUMENTS

| | | |
|---|---|---|
| WO | WO94/26121 | 11/1994 |
| WO | WO96/08155 | 3/1996 |
| WO | WO96/36238 | 11/1996 |
| WO | WO97/49295 | 12/1997 |
| WO | WO98/02047 | 1/1998 |
| WO | WO98/41102 | 9/1998 |
| WO | WO 98/57549 | 12/1998 |

METHOD AND PLANT FOR PRODUCING A STERILE MILK PRODUCT

CROSS-REFERENCE TO RELATED APPLICATIONS

This application is a continuation-in-part of application Ser. No. 09/709,419, filed Nov. 13, 2000, now U.S. Pat. No. 6,372,276, which is a continuation-in-part of application Ser. No. 09/446,270, filed Mar. 29, 2000, now U.S. Pat. No. 6,326,044. The priority of which is claimed, and each of which is incorporated herein in its entirety.

FIELD OF THE INVENTION

The invention relates generally to a method and a plant for processing milk and, in particular, to a method and a plant for producing a sterile milk product.

BACKGROUND OF THE INVENTION

Milk processing typically involves several steps, including separation of raw milk into a milk portion and a cream portion, filtering the milk portion to form a permeate and a retentate, heating and/or filtering the permeate to reduce the number of live microorganisms, heating the cream to reduce the number of live microorganisms, recombining the treated cream and treated milk, homogenizing the combined milk and cream, and packaging the resultant milk product. The retentate resulting from microfiltration of the milk product can be recycled into the cream or milk processing stream, used in other processing streams, or discarded.

In order to increase the efficiency of milk processing and reduce costs, it is desirable that the amount of raw milk lost or discarded during each step of milk processing be minimized.

Raw milk naturally contains various microorganisms such as bacteria, yeast and mold. Additionally, raw milk may come into contact with and retain additional microorganisms during storage and transport. These microorganisms can contribute to the degradation and eventual spoilage of milk. It is therefore desirable to remove or deactivate these microorganisms.

Microorganisms such as bacteria can be categorized by size and/or heat sensitivity.

Heat resistant bacteria are bacteria which can be deactivated by, for example, heating to a temperature of from at least about 140° C. to about 150° C. for about 4 to about 6 seconds as known to practitioners in the art. This category of bacteria is normally referred to as spores, and includes bacteria of species Bacillus and Clostridium. These bacteria, as defined by their least diameter, are about 0.5 $\mu$m or larger. The smallest heat resistant bacterium identified in milk by the inventor is *Bacillus pumilis,* which has a least diameter of about 0.5 $\mu$m.

Thermoduric bacteria are bacteria which are deactivated by, for example, heating to temperatures of about 100° C. for a few seconds, or equivalent time and temperature combinations as known to practitioners in the art. The smallest thermoduric bacterium identified in milk by the inventor is microbacterium Lacticum, which has a least diameter of about 0.3–0.4 $\mu$m. Thus, these bacteria have a least diameter of about 0.3 $\mu$m or larger.

Heat sensitive bacteria are bacteria which are deactivated by, for example, heating to temperatures as low as about 72° C. to about 75° C. for about 15 to about 20 seconds, or equivalent time and temperature combinations as known to practitioners in the art. The smallest heat sensitive bacterium has a least diameter of less than about 0.3 $\mu$m.

Raw milk also contains naturally occurring enzymes, as well as extracellular enzymes produced by microorganisms, such as psychrotrophic bacteria, which are typically present in milk. Certain of these enzymes are known to be bound to somatic cells which typically have a least diameter larger than about 0.5 $\mu$m. These enzymes can also contribute to the degradation and eventual spoilage of milk.

It is desirable to remove or deactivate the above types of bacteria and enzymes, as well as other microorganisms, in order to prevent degradation of the raw milk and/or resultant milk products.

Typically, microorganisms and enzymes are deactivated by heat treatments and/or removed by filtration of the raw milk. The use of heat treatments alone, however, can impart an undesirable cooked flavor to the milk due to the high temperatures (e.g., 140–150° C.) required to deactivate heat resistant microorganisms. Also, filtration alone does not remove all live microorganisms present in the raw milk.

Combinations of filtration and heat treatment have been used to provide a purer milk product wherein more of the microorganisms are removed or deactivated than would occur using either heat treatment or filtration alone. See, for example, WO 98/57549 and U.S. Pat. No. 5,935,632.

Filtration produces a retentate in which the microorganisms are highly concentrated. The concentration of microorganisms in the retentate can be, for example, at least about 10 to 100 times higher than in the raw milk. This retentate typically comprises from at least about 1% to about 10% of the total incoming raw milk. Multiple filtrations of the retentate produce a final retentate in which the microorganisms are even more concentrated, but wherein less milk is retained in the retentate, typically about 1% or less. See, for example, WO 98/57549.

The retentate from filtration can be recycled into the milk or cream processing stream as described, for example, in U.S. Pat. No. 5,935,632, wherein the retentate is added to the cream portion for processing with the cream, or in U.S. Pat. No. 5,683,733, wherein the retentate is added to the milk processing stream before the milk processing stream is fed to the separator. In either case, the number of microorganisms in the cream portion or in the resultant milk product is increased. The retentate can also be discarded as waste, as described, for example, in WO 98/57549. However, this results in a lower yield.

There thus remains a need in the art to develop a process by which the concentration of microorganisms in the milk product can be reduced while the yield or the percentage of raw milk which becomes final milk product is increased.

SUMMARY OF THE INVENTION

It is an object of this invention to provide a process and apparatus for producing a sterile milk product that overcomes the deficiencies of the prior processes and apparatus. The process in accordance with a preferred embodiment of the inventions includes: filtering a skim milk portion through at least one first filter to form a first permeate and a first retentate; filtering the first retentate through at least one retentate filter to form a second permeate and a second retentate; and mixing the second permeate into the skim milk portion prior to filtration by the first filter. This invention includes the plant for performing the process.

A second embodiment of the method of this invention includes: separating raw milk to form a skim milk portion and a cream portion; filtering the skim milk portion through a first filter to form a first permeate and a first retentate; filtering the first retentate through at least one retentate filter to form a second permeate; and mixing the second permeate into one or more of the raw milk, the skim milk portion and/or the cream portion. The method may also include steps of heating the first permeate to form a treated skim milk portion, standardizing and heating the cream portion to form sterile cream and remixing the sterile cream with the treated skim milk portion to form a sterile milk product.

A plant for performing the process apparatus in accordance with another preferred embodiment of the invention includes: a conduit for feeding a skim milk portion into a first microfiltration unit for separating the skim milk portion into a first retentate and a first permeate; a conduit for the first retentate; a second microfiltration unit for separating the first retentate into a second retentate and a second permeate; and a conduit for the second permeate. The conduit for the second permeate recirculating the second permeate into the conduit for the skim milk portion.

A second embodiment of the apparatus of this invention includes: a conduit for feeding raw milk into a separating unit; a separating unit for separating the raw milk into a cream portion and a skim milk portion; a conduit for the cream portion; a standardization unit for the cream portion; a heat treatment unit for the standardized cream portion, the heat treatment unit for the cream portion adapted to sterilize the cream portion; a conduit for the skim milk portion; a first microfiltration unit for separating the skim milk portion into a first retentate and a first permeate; a conduit for the first permeate; a conduit for the first retentate; a second microfiltration unit for separating the first retentate into a second retentate and a second permeate; and a conduit for the second permeate. The conduit for the second permeate recirculates the second permeate into one or more of the conduit for the skim milk portion, the conduit for the raw milk, the conduit for the cream portion, and the standardization unit for the cream portion.

Other aspects and features of the invention will be apparent to practitioners in the art upon review of the entire specification and claims.

BRIEF DESCRIPTION OF THE DRAWINGS

Preferred embodiments of the invention are descried herein with reference to the accompanying drawings in which.

DETAILED DESCRIPTION OF THE INVENTION

The apparatus and process of this invention as described herein produce a sterile milk product at high yields is provided wherein the milk product has a reduced concentration of microorganisms compared to raw milk. According to a preferred embodiment of the invention, the yield of the process is such that at least about 99% of the milk portion of the raw milk is processed into a final milk product. More preferably, at least about 99.5% of the milk portion and most preferably at least about 99.8% of the milk portion of the raw milk is processed into a final milk product.

Certain terminology as used herein is specifically defined below. Other terminology is defined elsewhere within the body of the text. Unless otherwise specified, all uses of a particular term are intended to have the meaning set forth herein. Undefined terms have their ordinary meaning as known to practitioners in the art.

By "sterile" it is meant an absence of microorganisms capable of multiplying under prevailing storage conditions.

By "stable" it is meant that the milk fraction and/or milk product does not degrade noticeably during a specified time period, wherein degradation is indicated by a change in flavor and/or texture of the milk product, usually accompanied by a change in odor.

By "shelf life" it is meant the period of time for which the milk product remains stable.

By "raw milk" is meant untreated milk. Raw milk is separated into a cream portion which is a standardized portion of raw milk having a fat content of between about 12% and about 65%, preferably about 40%, and skim milk having a fat content of from about 0.05% to about 0.15%.

By "skim milk portion" it is meant the milk portion that is fed into the first filter. The skim milk portion can be skim milk (e.g., from the separator) or standardized milk provided by the addition of cream to the skim milk from the separator. The standardized milk comprises a specified amount of fat, typically at least 0.05% fat.

By "permeate" is meant the raw milk portion which has passed through at least one filter.

By "retentate" is meant the raw milk portion retained by at least one filter.

By "milk product" it is meant the raw milk portion after processing by filtration and heating methods, which forms a consumer ready milk beverage or is made into another consumer milk product.

The process according to the invention will now be set forth in detail with reference to FIG. 1.

Figure 1:
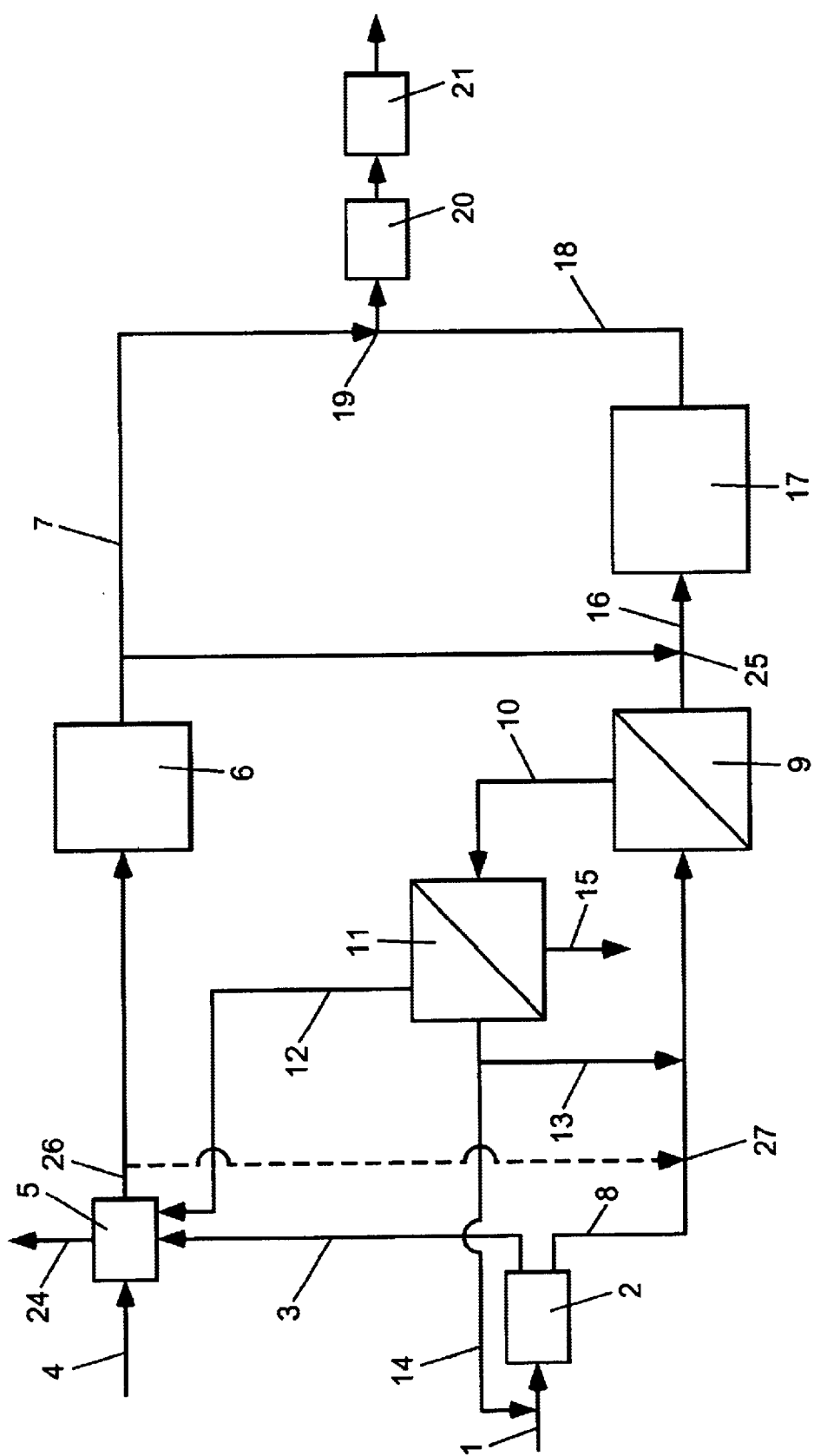
FIG. 1 is a flow diagram of a plant and a process for forming sterile milk according to the invention.

As shown in FIG. 1, raw milk 1 to be treated is conveyed by a conduit 1 to a separator 2. The separator 2 can be a conventional separator, requiring the raw milk to be heated to a temperature from about 50° C. to about 60° C. Alternatively, a cold separator may be employed at a temperature of from about 4° C. to about 6° C. and the raw milk may not be heated before separation. The raw milk 1 is separated by separator 2 into cream portion 3 and skim milk portion 8. Both the cream portion 3 and the skim milk portion 8 are maintained at a low temperature of from about 4° C. to about 15° C. if a cold separator is used, or at higher temperatures of from about 45° C. to about 60° C. if a conventional separator is employed. Preferably, for ease of production, a conventional separator is used and separation occurs at a temperature of from about 45° C. to about 60° C., most preferably from about 50° C. to about 55° C.

The cream portion 3 flows to a standardization unit 5 to form a standardized cream portion 26 having a desired fat content. The standardized cream portion 26 can be admixed into the skim milk portion 27 before filtration thereof to provide the skim milk portion with a desired fat content. Additional cream 4 may be added to the process stream as needed. Also, excess cream 24 may be removed from the process stream for separate treatment or use.

The standardized cream portion 26 can be treated at unit 6 by heat in order to sterilize the cream or recombined with skim milk portion 8. The heat treatment may be by UHT of greater than at least about 135° C. for a period of at least one second, preferably greater than at least about 140° C. for at least 4 seconds, or by an alternative conventional heat treatment method. For example, the cream portion may be heated to a temperature of about 121° C. for a period of about one minute. Lower or higher temperatures may also be employed with corresponding adjustments to treatment time.

After this heat treatment, the sterile cream portion 7 can be reintroduced 19 into the permeate milk portion at any time before 25 or after 19 heat treatment of the permeate, thereby forming standardized milk.

After separation, the skim milk 8 from the separator 2 can either be fed directly to first filter 9 or recombined with a portion of the cream portion to form standardized milk. For purposes of simplicity, the milk portion fed into the first filter 9, whether skim milk or standardized milk, will be referred to as skim milk portion 8.

In the present invention, filtration is preferably conducted at a skim milk portion 8 temperature of from about 45° C. to about 60° C., preferably from about 50° C. to about 55° C. The first filter 9 can be made any suitable material (e.g., ceramic, glass, polymeric fiber, etc.) or combination of materials known in the art. Suitable filtration media include those disclosed in U.S. Pat. No. 5,256,437, which is hereby incorporated by reference.

In a preferred embodiment of the invention, the first filter 9 has an effective pore size of about 0.5 $\mu$m or less, meaning that the first filter 9 is capable of effectively separating from the skim milk portion 8 all microorganisms, cells, enzymes or other materials which are larger than or equal to 0.5 $\mu$m, including all heat resistant bacteria. Effective separation means a reduction in the concentration of microorganisms by a factor of at least about 1,000,000, or a reduction of about log 6 or greater. Preferably, the concentration of microorganisms present in the first permeate 16, particularly the concentration of heat resistant bacteria such as *B. Pumilis*, as compared to the milk portion 8 is reduced by a factor of at least about log 8, most preferably by at least about log 9.

For any given filter, the effective pore size may not correspond to the actual pore size of the filter. Depending on the type of filter, the actual pore size of the filter may be larger or smaller than the effective pore size. The interaction of the various components of the milk with the material of the filter as well as the operating conditions during filtration can influence the effective pore size of the filter.

In the present invention, a first filter 9 with an effective pore size of about 0.5 $\mu$m or less is preferably combined with a subsequent heat treatment 17 of the permeate of the first filter. This heat treatment is preferably conducted at a temperature of from about 90° C. to about 105° C. A combined filtration/heat treatment process of this type is described in WO 98/57549, and in co-pending U.S. patent application Ser. No. 09/709,419, filed Nov. 13, 2000, both of which are hereby incorporated by reference in their entirely. By using a combination of filtration and heat treatment, a milk product which is sterile and preferably stable can be obtained.

In an alternative embodiment, the first filter 9 can have an effective pore size of about 0.3 $\mu$m or less, meaning that the first filter 9 is capable of effectively separating from the milk portion 8 all microorganisms, cells, or other materials which are equal to or larger than 0.3 $\mu$m in diameter, including all heat resistant bacteria and all thermoduric bacteria. By the use of such a filter, the number of microorganisms, in particular the number of thermoduric bacteria such as microbacterium Lacticum, can be reduced by a factor of at least about log 8, preferably at least about log 9, most preferably by at least about log 10. According to a preferred embodiment of the invention, any bacteria remaining in the first permeate 16 are heat sensitive.

Filtration with a first filter 9 having an effective pore size of 0.3 $\mu$m or less can also be combined with a heat treatment 17 of from about 72° C. to about 98° C., as described above. This combined treatment can be used to produce a sterile and preferably stable milk product.

Although a small effective pore size is desirable in order to retain as many undesirable milk components as possible, too small an effective pore size can be detrimental to milk processing. For example, if the effective pore size of the first filter 9 is too small, the pores of the first filter 9 can become clogged by the first retentate and the speed of flow of the milk portion 8 through first filter 9 can thereby be reduced significantly.

The skim milk portion 8 is separated by first filter 9 into a first permeate 16 and a first retentate 10. The first retentate 10 can comprise up to 50% of the milk portion 8. In a preferred embodiment of the invention, the first retentate 10 comprises less than about 10%, more preferably less than or equal to about 5%, most preferably less than or equal to about 1%, of skim milk portion 8. In trials which have been carried out with a first filter 9 having an effective pore size of 0.5 $\mu$m, the first retentate 10 comprised about 5% of the milk portion 8. This first retentate contained all separated solids with a least diameter $\geq$0.5 $\mu$m.

According to the present invention, the first retentate 10 can be fed from the first filter 9 to a second or retentate filter 11. As with the first filter 9, the retentate filter 11 can be made of any suitable material (e.g., ceramics, polymer fibers, etc.) known in the art. According to the invention, the retentate filter 11 will preferably have an effective pore size that is equal to or greater than the effective pore size of first filter 9. Thus, when the first filter 9 has an effective pore size of about 0.5 $\mu$m, the retentate filter 11 has an effective pore size $\geq$0.5 $\mu$m. The effective pore size of the retentate filter 11 is preferably from about 0.5 µm to about 2.0 µm and more preferably from about 1.0 µm to about 1.5 µm.

The first retentate 10 is divided by retentate filter 11 into a second permeate and a second retentate 15. This second permeate preferably comprises about 4% or greater of the milk portion 8 (i.e., at least about 80% of the first retentate 10).

The second retentate 15, which preferably comprises less than or equal to about 1% of milk portion 8, contains all of the microorganisms, cells, enzymes and the like which are $\geq 0.5$ µm and which have been separated from the milk portion 8 by the first filter 9 and from the first retentate 10 by the retentate filter 11. In a preferred embodiment of the invention, the second retentate 15 is discarded or otherwise not further employed in the production of a sterile milk product.

The above percentages for the amounts of the first and second retentate are exemplary only. The total amount of second rententate 15 is preferably less than about 1% of the milk portion 8. For example, the total amount of second rententate 15 can be less than or equal to about 0.5% of the milk portion 8, and, more preferably, less than or equal to about 0.2% of the milk portion 8.

Each filtration concentrates the amount of microorganisms in the resultant retentate. The concentration of microorganisms in the first retentate 10, for example, can be increased by a factor of from about 10 to about 100 compared to milk portion 8. Similarly, filtration of the first retentate 10 can further concentrate the microorganisms in the resultant second rententate 15 by a factor of from about 10 to about 100. Thus, the concentration of microorganisms in the second permeate as compared to the milk portion 8 can be reduced by a factor of from about 10 to about 100,000 (log 1 to log 5). The degree of concentration of the microorganisms in the second retentate can be influenced by various factors such as, but not limited to, the area and efficiency of the first filter 9 and of the retentate filter 11, the flow rate, etc.

The first filter 9 and the retentate filter 11 can each comprise one or a plurality of filters. The number of first filters can be chosen based on various factors known in the art, including, but not limited to, the quality of the raw milk portion and the efficiency which is obtained with first filter 9.

To increase the efficiency of the process, and to reduce the costs associated therewith, the second permeate generated by the retentate filter 11 can be recycled into the processing stream in one or more places 12, 13 or 14, as shown in FIGS. 2–5. Various embodiments of recycling the second permeate will now be described in detail with reference to these Figures.

Figure 2:
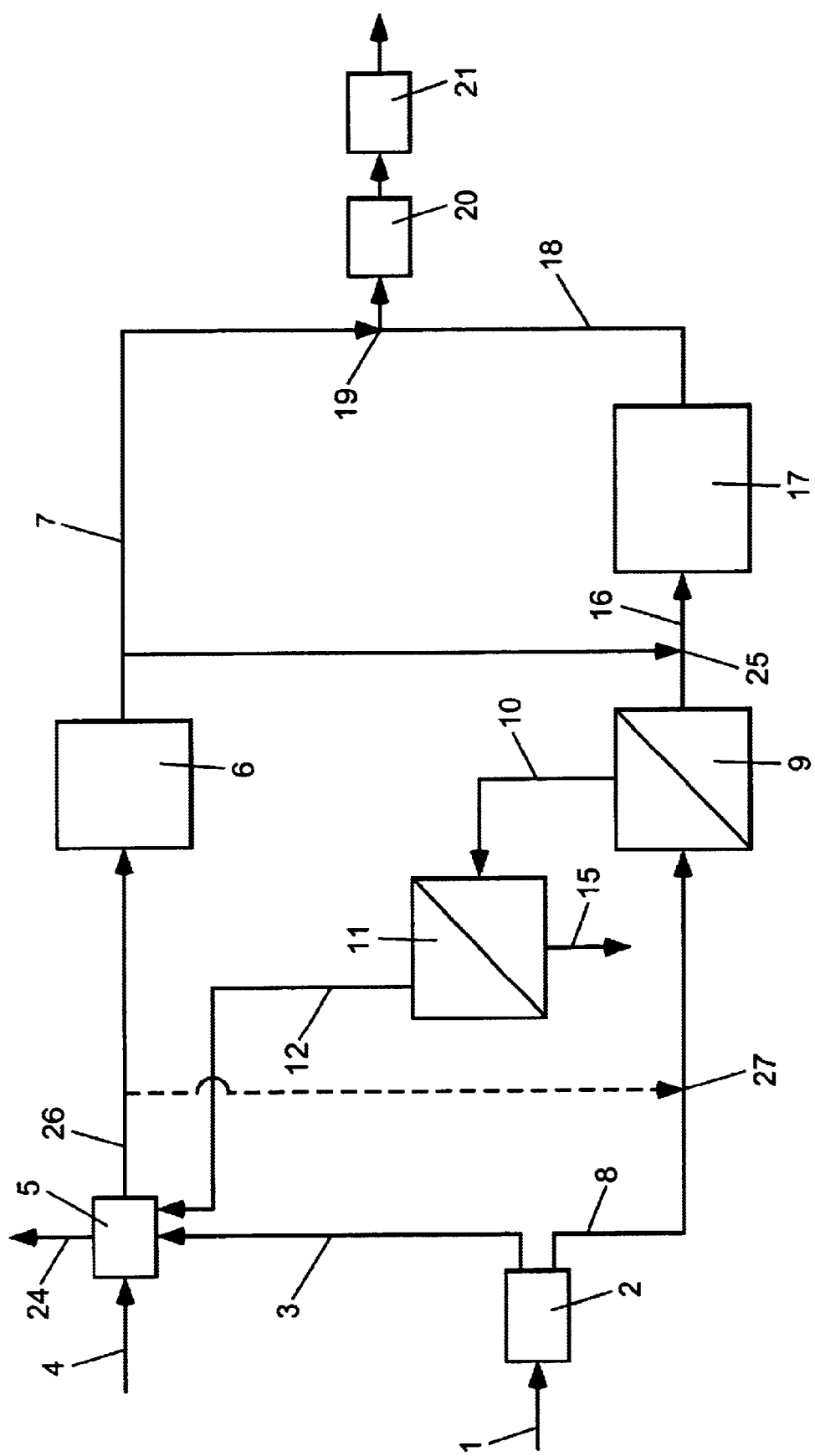
FIG. 2 is a flow diagram of a plant and a process for forming sterile milk according to the invention wherein the second permeate is recycled into the cream portion.

As shown in FIG. 2, all or a portion of the second permeate 12 can be directed to the standardization unit 5 for combination with the cream portion 3 to produce a diluted cream portion. Since the second permeate 12 contains a lower concentration of microorganisms than the cream portion 3, addition of the second permeate 12 to the cream portion 3 can reduce the concentration of microorganisms in the cream portion 3. As a result, the standardized cream and sterile cream produced from the diluted cream portion can have a lower concentration of microorganisms compared to a standardized cream or a sterile cream resulting from an undiluted cream portion. The second permeate can also be combined with the cream portion 3 prior to entering the standardization unit (not shown).

Figure 3:
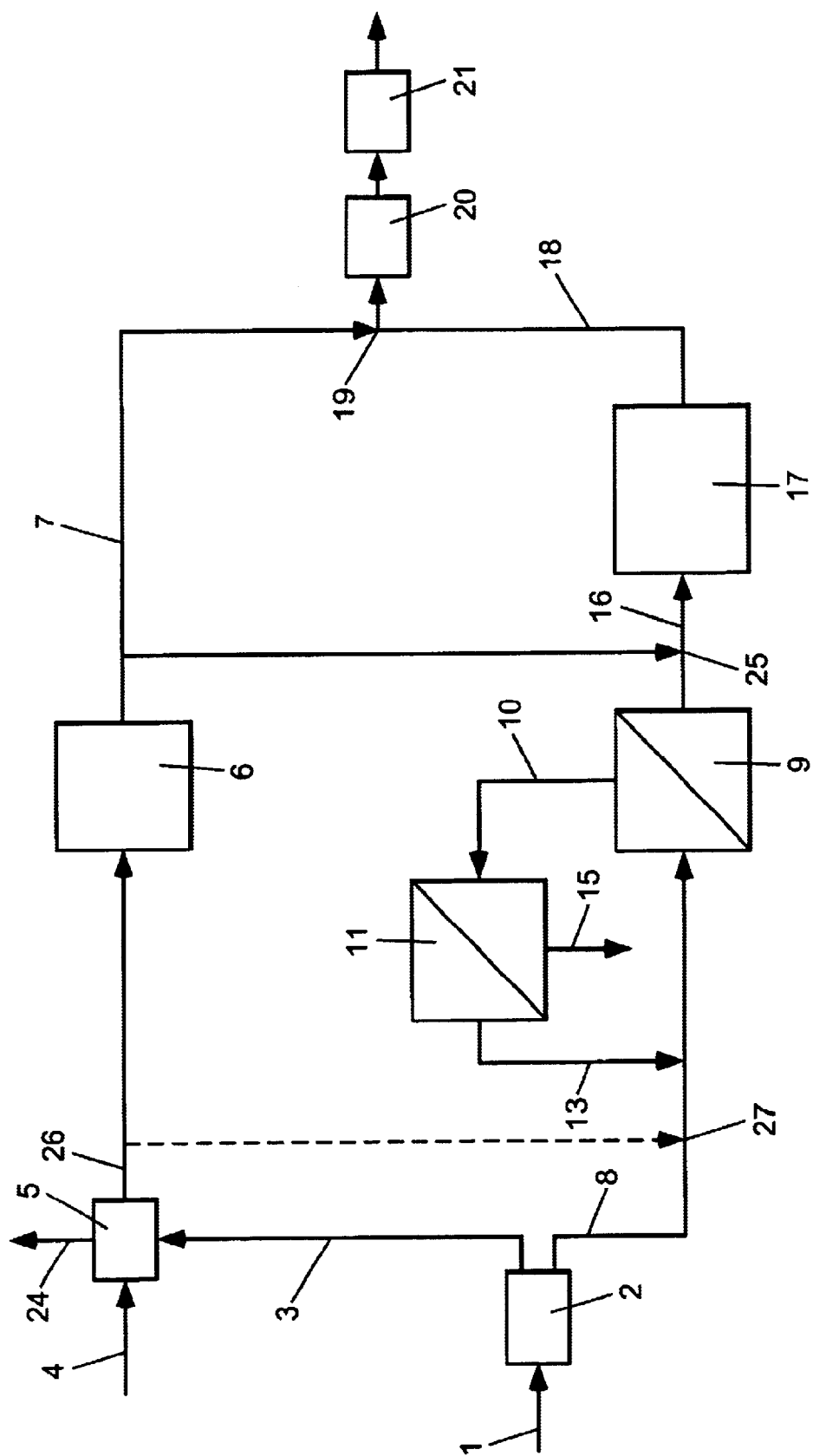
FIG. 3 is a flow diagram of a plant and a process for forming sterile milk according to the invention wherein the second permeate is recycled into the skim milk portion.

In another embodiment, all or a portion of the second permeate 13 can be combined with the skim milk portion 8 prior to entering the first filter 9, as shown in FIG. 3. By combining the second permeate 13 with skim milk portion 8 in this manner, a diluted milk portion with a lower concentration of microorganisms than milk portion 8 can be produced. Because the concentration of microorganisms in the diluted milk portion is lower than the concentration of microorganisms in milk portion 8, the load on first filter 9 and retentate filter 11 can be reduced. Thus, recycling of the second permeate 13 into milk portion 8 can actually reduce the load on first filter 9 and retentate filter 11, extending the production time between cleaning of these filters and thereby reducing production costs. Further, the permeate 16 can be purer, having a lower concentration of microorganisms compared to a milk product made by a process wherein the second permeate is not recycled in the manner outlined above.

Figure 4:
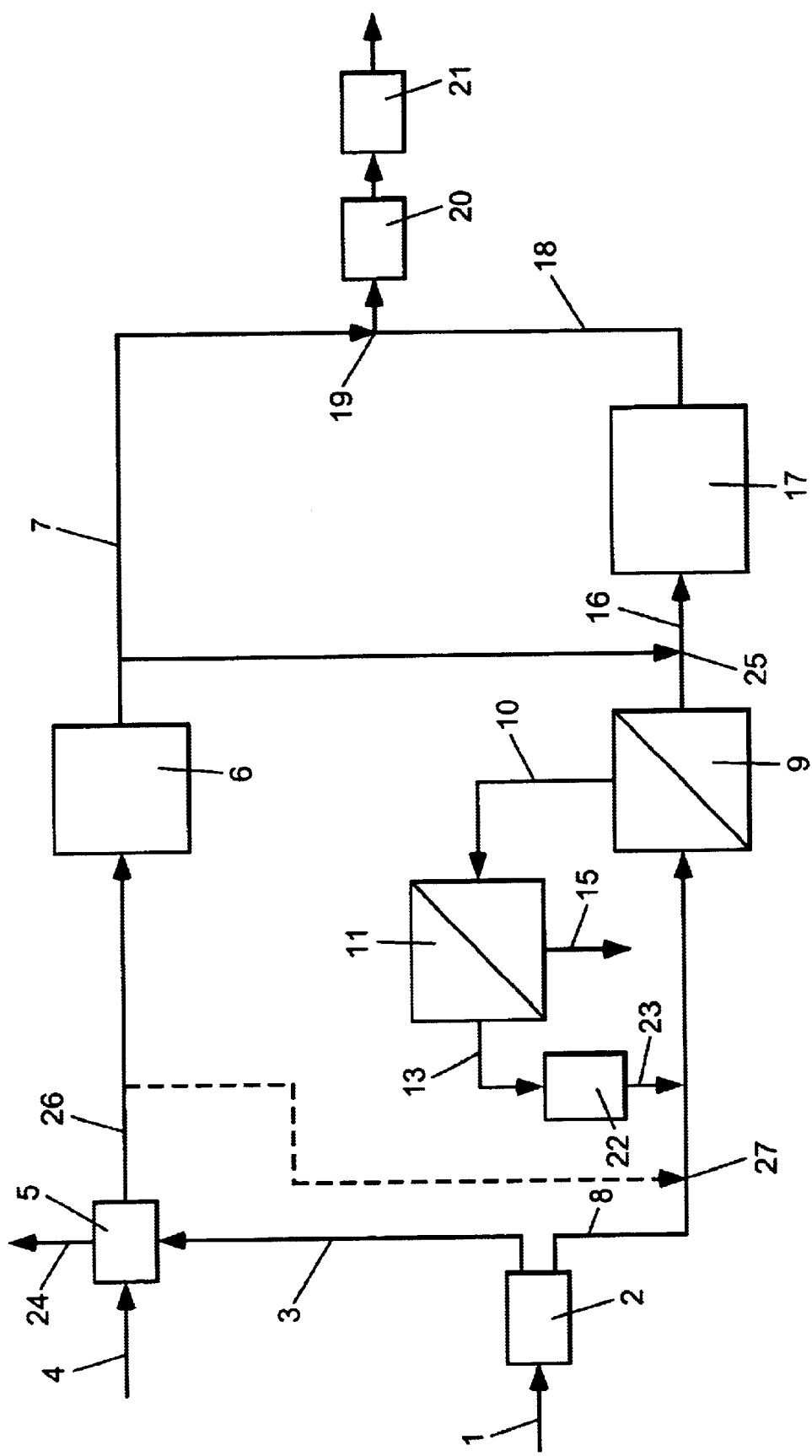
FIG. 4 a flow diagram of a plant and a process for forming sterile milk according to the invention wherein the second permeate is homogenized and then recycled into the skim milk portion.

In an alternative embodiment shown in FIG. 4, all or a portion of the second permeate 13 can be homogenized 22 and the homogenized second permeate 23 then combined with skim milk portion 8 prior to filtration by first filter 9. While not wishing to be bound by theory, it is believed that homogenization of the second permeate can reduce the particle size of the second permeate milk components, such as fats and proteins, in particular casein, which can become aggregated during filtration. Homogenization can break up these aggregated milk components to form smaller particles which are more easily filtered. Thus, homogenization of the second permeate prior to filtration by first filter 9 can reduce the load on filter 9 and can also can help reduce any possible retention of proteins in the permeate 16 from filter 9.

Figure 5:
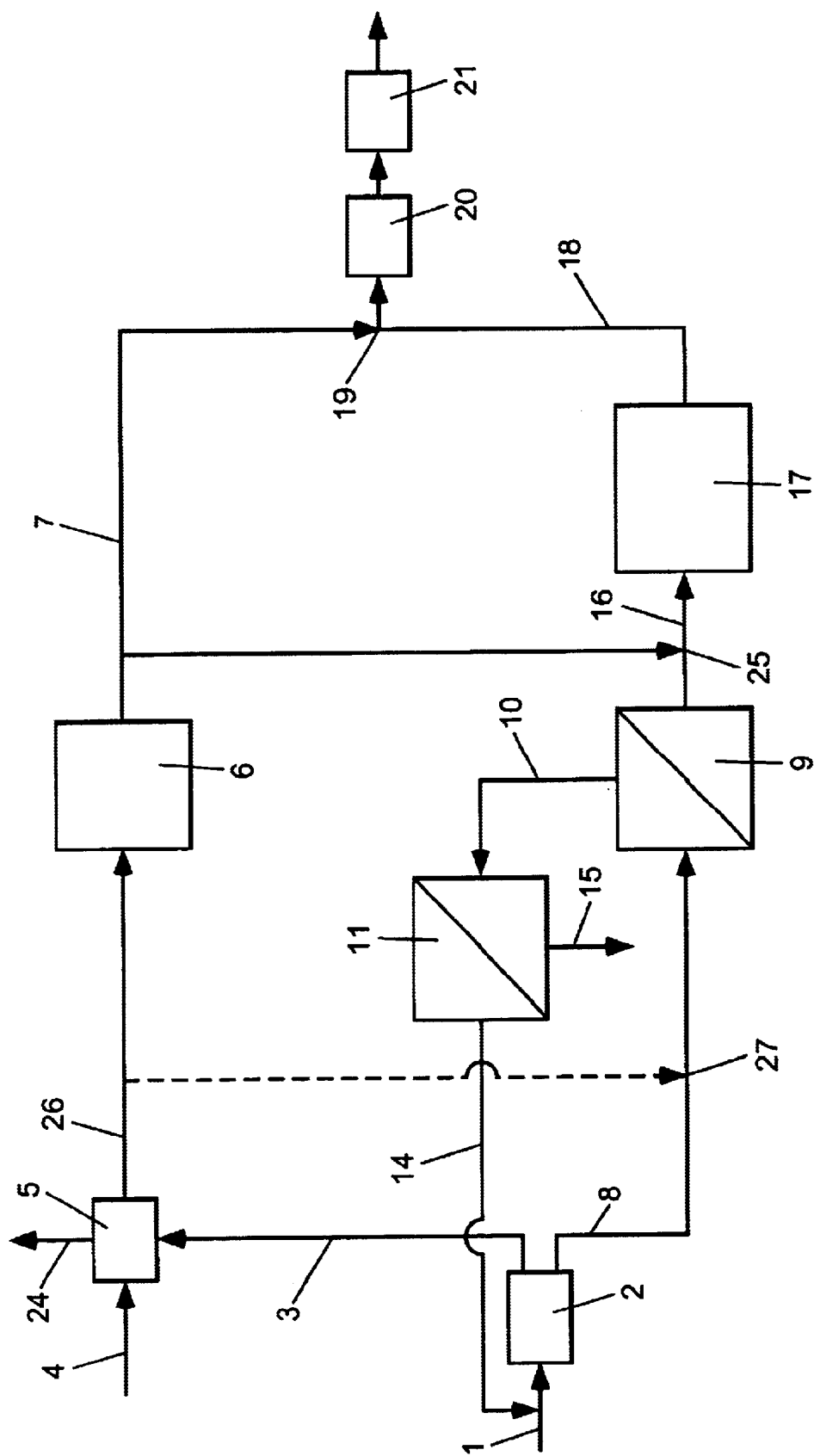
FIG. 5 is a flow diagram of a plant and a process for forming sterile milk according to the invention wherein the second permeate is recycled into the raw milk.

In another embodiment shown in FIG. 5, all or a portion of the second permeate 14 can be recombined with the raw milk before separation 2. In this manner, a diluted raw milk having a lower concentration of microorganisms can be produced.

By recycling the second permeate into the cream portion, the milk portion and/or the raw milk as set forth above, a larger percentage of the raw milk that enters the process stream can actually be processed into a milk product. Further, the resultant milk or cream product can have a reduced concentration of microorganisms because the portion of the process stream to which the permeate is added, whether the raw milk, the milk portion or the cream portion, can have a lower concentration of microorganisms than the cream or milk product in that process stream. The second permeate, which may contain from about 10 to about 100,000 times fewer microorganisms than milk portion 8, can thus be used to reduce the concentration of microorganisms remaining in the resultant milk or cream product. As a result, a purer product can be provided while minimizing waste.

Figure 6A:
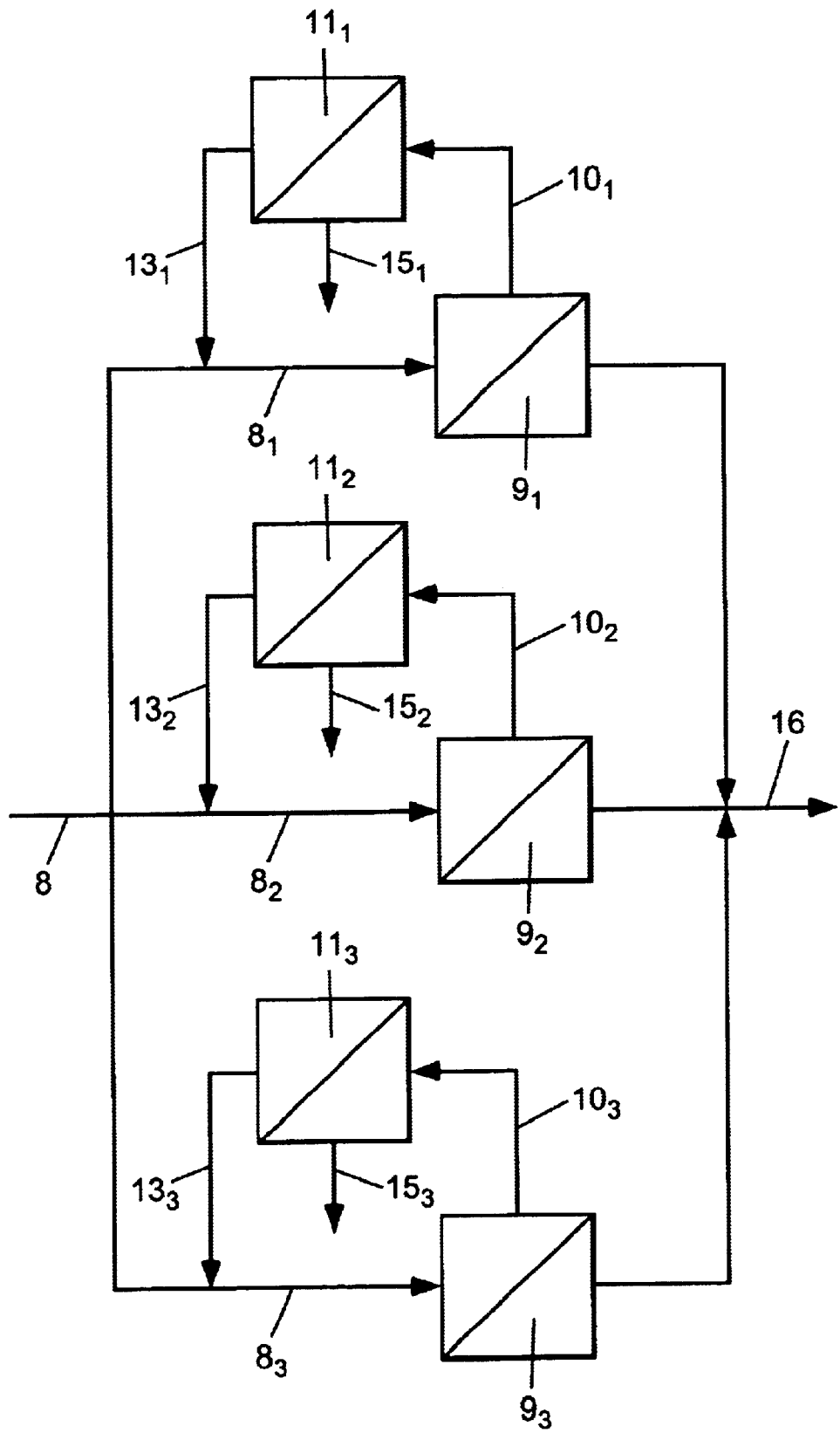
FIG. 6A is a flow diagram of a first embodiment of the filtering section in a plant or process for forming sterile milk wherein the first filter comprises a plurality of filters in parallel and the retentate streams from each of the first filters are fed to separate retentate filters.
Figure 6B:
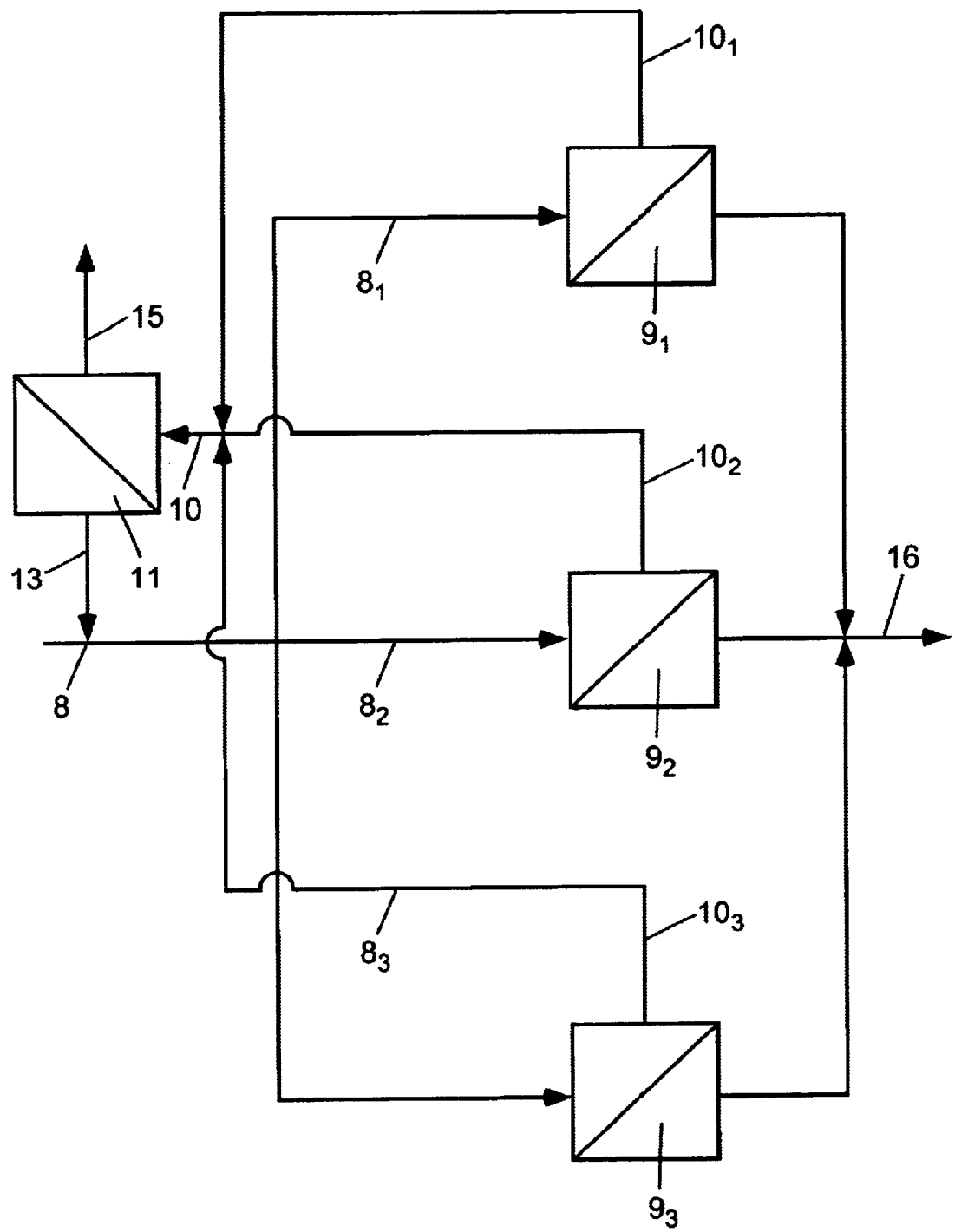
FIG. 6B is a diagram of a second embodiment of the filtering section in a plant or process for forming sterile milk wherein the first filter comprises a plurality of filters in parallel and the retentate streams from each of the first filters are combined to form the first retentate.

As shown in FIGS. 6A and 6B, the milk portion 8 can be divided into two or more streams so that each milk portion stream is directed to a separate first filter. In FIGS. 6A and 6B, skim milk portion 8 is divided into three streams $8_1$, $8_2$, $8_3$ each of which is fed to a separate first filter $9_1$, $9_2$, $9_3$. Each of the first filters can have an effective pore size of $\geq 0.5$ µm, preferably $\geq 0.3$ µm. Each of the first retentate streams $10_1$, $10_2$, $10_3$ can then be filtered through a plurality of retentate filters $11_1$, $11_2$, $11_3$ as shown in FIG. 6A. These retentate filters can have an effective pore size which is the same or larger than the first filters $9_1$, $9_2$, $9_3$. The permeate streams $13_1$, $13_2$, $13_3$ from retentate filters $11_1$, $11_2$, $11_3$, respectively, can then be mixed with each of the respective milk portion streams. Each of the second retentate streams $15_1$, $15_2$, $15_3$ from retentate filters $11_1$, $11_2$, $11_3$ can then be discarded or combined to form a second retentate.

Alternatively, as shown in FIG. 6B, each of the first retentate streams $10_1$, $10_2$, $10_3$ can be combined to form the first retentate 10. The first retentate 10 can be fed to a retentate filter 11 to form the second permeate 13 and the second retentate 15. The second permeate 13 can then be mixed with milk stream 8 before it is divided. The second rententate 15 from retentate filter 11 can then be discarded.

Figure 7A:
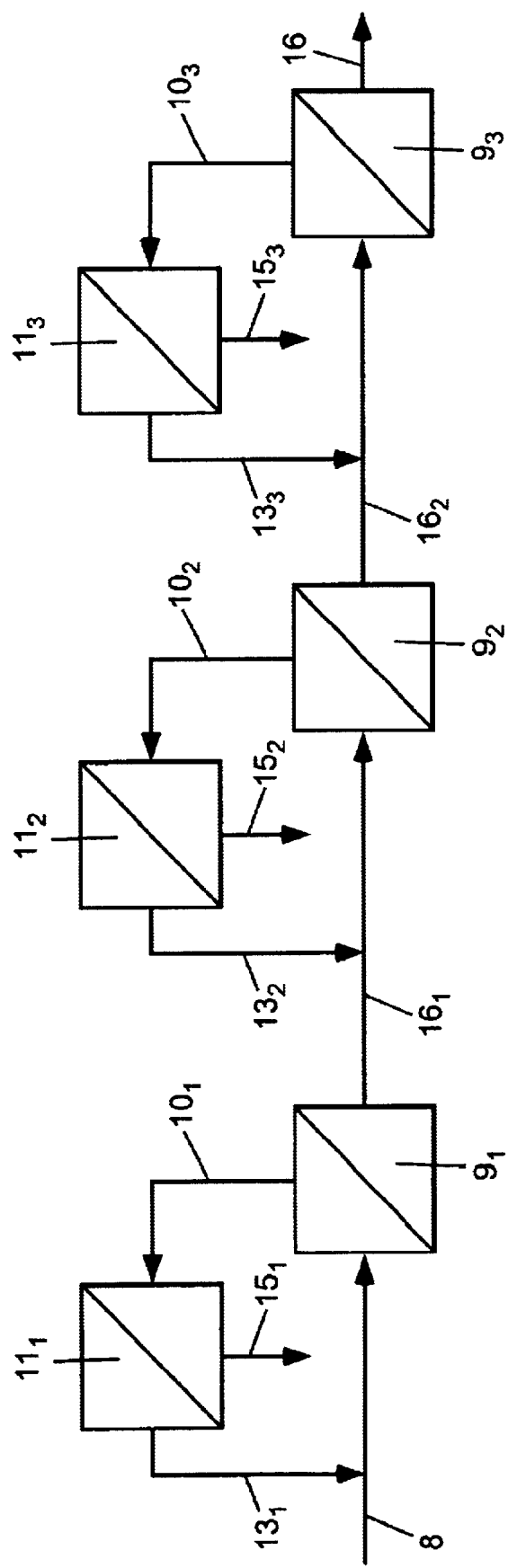
FIG. 7A is a diagram of a first embodiment of the filtering section of a plant or process for forming sterile milk wherein the first filter comprises a plurality of filters in series and the retentate streams from each of the first filters are fed to separate retentate filters.
Figure 7B:
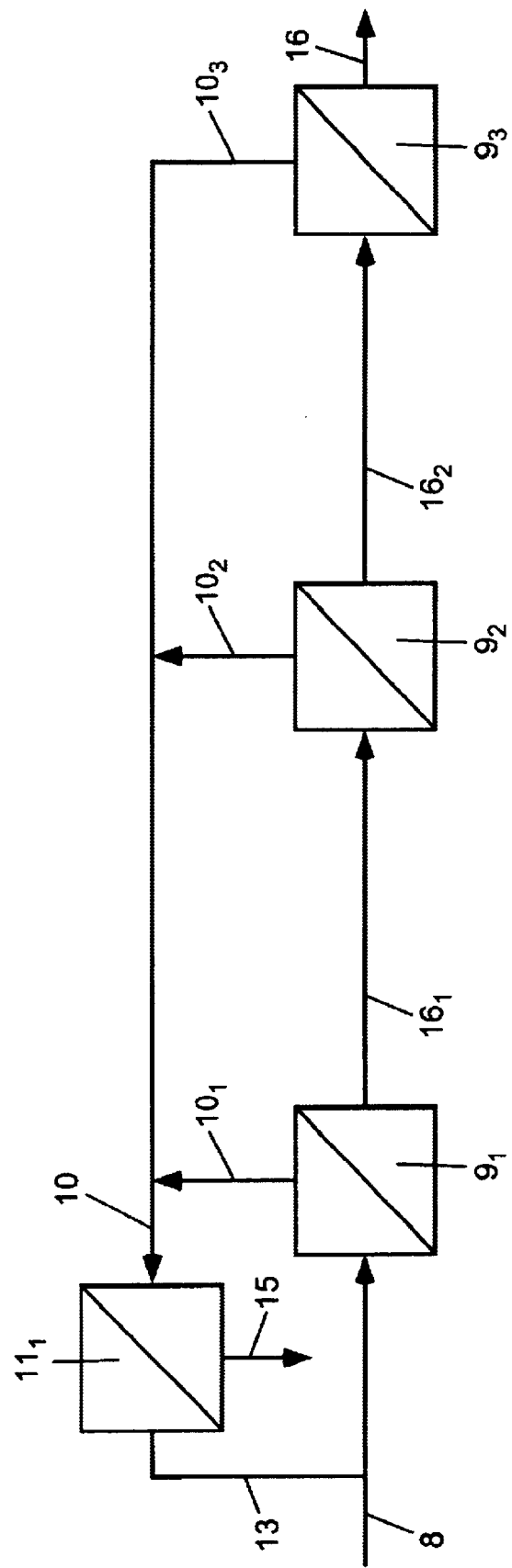
FIG. 7B is a diagram of a second embodiment of the filtering section of a plant or process for forming sterile milk wherein the first filter comprises a plurality of filters in series and the retentate streams from each of the first filters are combined to form the first retentate.

FIGS. 7A and 7B show serial filtration of the first permeate 16 through a series of first filters. In FIGS. 7A and 7B, three such filters are shown $9_1$, $9_2$, $9_3$. In a first embodiment shown in FIG. 7A, milk portion 8 is directed through a first filter $9_1$, producing a first retentate $10_1$ and a first permeate $16_1$. The first permeate $16_1$ can then be filtered through an additional first filter $9_2$ having an effective pore size equal to or smaller than first filter $9_1$, producing a second first retentate $10_2$ and a second first permeate $16_2$. As shown, the second first permeate $16_2$ can then be filtered through a third first filter $9_3$ having an effective pore size equal to or smaller than the second first filter $9_2$, producing a third retentate $10_3$ and a third or final first permeate 16. Preferably, each subsequent first filter has an effective pore size smaller than that of the previous first filter. The retentate streams $10_1$, $10_2$, $10_3$ from each of the first filters $9_1$, $9_2$, $9_3$ can each then be fed to a corresponding retentate filter $11_1$, $11_2$, $11_3$. The permeate streams $13_1$, $13_2$, $13_3$ from each of retentate filters $11_1$, $11_2$, $11_3$, respectively, can then be recirculated into milk portion 8, first permeate $16_1$ and second first permeate $16_2$, respectively. Each of the second retentate streams $15_1$, $15_2$, $15_3$ from retentate filters $11_1$, $11_2$, $11_3$, respectively, can then be discarded or combined to form a second retentate. The final permeate 16 from the last first filter in the series $9_3$ is designated first permeate 16 and can be subsequently processed by a heat treatment as described herein. As with the aforementioned embodiment, each of the retentate streams $15_1$, $15_2$, $15_3$ from retentate filters $11_1$, $11_2$, $11_3$ can be discarded.

FIG. 7B shows an alternative embodiment of a serial filtration process wherein the retentate streams $10_1$, $10_2$, $10_3$ from each of the first filters $9_1$, $9_2$, $9_3$ are combined to form first retentate 10. The first retentate 10 can then be fed to a retentate filter 11 to form the second permeate 13 and the second retentate 15. The second permeate 13 can then be mixed with milk stream 8 before it is divided. The second rententate 15 from retentate filter 11 can then be discarded.

Figure 8:
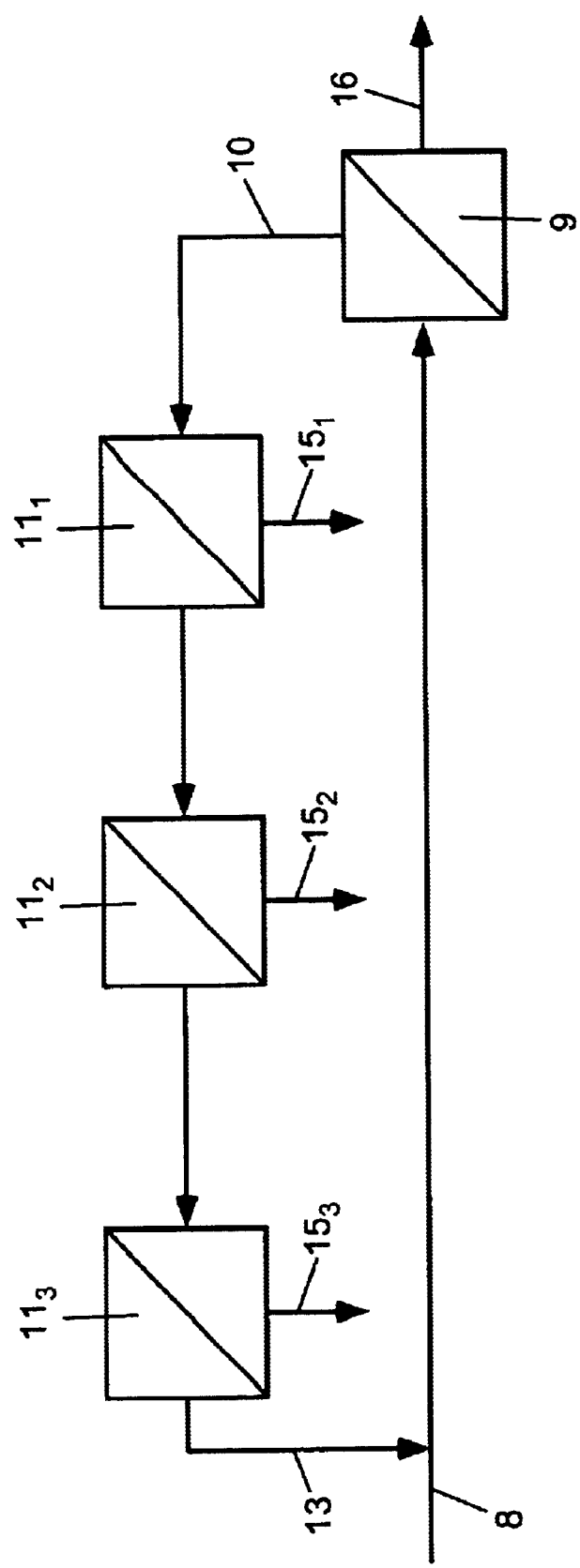
FIG. 8 is a diagram of the filtering section of a process for forming sterile milk wherein the retentate filter comprises a plurality of filters in series.

FIG. 8 shows a plurality of retentate filters in series. As shown in FIG. 8, the permeate from retentate filter $11_1$ is filtered through additional retentate filters $11_2$, $11_3$ to produce a final second permeate 13. As with the other embodiments of the invention, each of the retentate streams $15_1$, $15_2$, $15_3$ from retentate filters $11_1$, $11_2$, $11_3$ can be discarded.

In the embodiments described above, three filters were employed. However, any number of filters may be employed to provide a milk product having desired properties. Further, any combination of the embodiments described above may also be employed.

As shown in FIG. 1, the first permeate 16 can be heat treated 17 using any heat treatment device known in the art. Heat treatment can be conducted, for example, in a conventional plate heat exchanger or other direct or indirect method of heating as known to practitioners in the art. Because the heat-resistant bacteria are removed from milk portion 8 by filtration with a first filter 9 having an effective pore size of about 0.5 μm or less, and all heat resistant and thermoduric bacteria are removed from milk portion 8 by filtration with a first filter 9 having an effective pore size of about 0.3 μm or less, lower heat treatments than normally applied in the art can be used to deactivate any remaining microorganisms and enzymes, thus obtaining treated milk portion 18.

The first permeate 16 can be sterilized in the heat treatment equipment 17 by any means known in the art. Preferably, the first permeate 16 is treated as described in WO 98/57549 at from about 78° C. to about 121° C. When the first filter effective pore size is about ≦0.5 μm, the first permeate 16 preferably is subjected to a heat treatment 17 of from about 90° C. to about 105° C., and even more preferably from about 95° C. to about 99° C. When the first filter effective pore size is about ≦0.3 μm, the first permeate 16 preferably is subjected to a heat treatment 17 of from about 78° C. to about 98° C., more preferably from about 78° C. to about 85° C.

The length of the heat treatment can be influenced by the heat treatment temperature. For example, the heat treatment can be conducted for about 1 minute or less, preferably about 30 seconds or less, more preferably about 15 seconds or less, even more preferably 10 seconds or less, and most preferably about 5 seconds or less. Alternate treatments, such as described in co-pending U.S. patent application Ser. No. 09/709,419, filed Nov. 13, 2000, or as known in the art, can also be used.

As shown in FIG. 1, the resultant treated milk portion 18 can be remixed 19 with the sterile cream 7 as needed, to form a milk product. The treated milk portion 18 and sterile cream 7 can be combined to achieve a milk product with a desired fat content. For example, whole milk, 2%, 1%, ½% or skim milk may be produced in this manner. When the milk product is to be used as a drinking milk, it is preferably homogenized 20.

Homogenization 20 can be carried out in order to obtain a milk product wherein the fat globules are reduced to relatively small fat globules of approximately equal size. If the milk product is not homogenized, the cream may precipitate, i.e., the fat globules may accumulate in the upper region of the fmished packaged milk product. Almost all drinking milk is therefore homogenized.

The homogenized milk product optionally is conveyed to one or more filling machines 21 which are preferably aseptic. The milk product is then packaged in containers which containers are also preferably aseptic. The filled containers can be distributed and stored at room temperature or chilled and refrigerated. The resultant milk product will preferably be stable under ambient conditions for periods of at least one month, preferably at least two months, most preferably at least three months or longer, without an appreciable loss or change of flavor or texture. If refrigerated, the shelf life of the milk product can be exponentially longer.

The milk product described herein can comprise more than about 95% of the milk portion, preferably more than about 99% of the milk portion, more preferably more than about 99.5% of the milk portion, and most preferably more than about 99.8% of the milk portion, and is sterile, stable and extremely pure.

The present invention realizes a method of producing a sterile milk product for storage under ambient conditions. The milk product is extremely pure having fewer killed or inactivated microorganisms, enzymes or somatic cells than are typically present in UHT or heat treated sterile milk. Further, according to the process of the invention, a high percentage of the raw milk (e.g., 95% or greater) entering the process stream can be converted into a usable milk product.

EXAMPLE

The following example is intended to demonstrate some of the features and advantages of the invention described herein. The scope of the invention is not limited to the following example, but is defined by the specification and attached claims.

Raw milk was separated into a cream portion and a milk portion. The milk portion was filtered in a first filter having an effective pore size of 0.5 μm, forming a first permeate and a first retentate.

The first retentate was filtered through a retentate filter having an effective pore size of 1.4 μm, forming a second retentate and a second permeate. The second retentate, comprising less than 0.5% of the milk portion, was discarded. The second permeate was recycled by adding it to the cream portion before standardization of the cream portion.

The filtration of the milk portion and first retentate reduced the concentration of microorganisms in the processing stream as follows:

| SECTION OF MILK PROCESSING | REDUCTION OR CONCENTRATION FACTOR | NUMBER OF MICRO-ORGANISMS |
|---|---|---|
| milk portion | — | 100,000,000/L |
| first retentate | concentrated 20× from milk portion | 2,000,000,000/L |
| first permeate | reduced 100,000× from milk portion | 1,000/L |
| second permeate | reduced 1,000× from first retentate | 2,000,000/L |
| second retentate | concentrated 20× from first retentate | 40,000,000,000/L |

As can be seen from the above table, the concentration of microorganisms in the second permeate was 50 times less than the concentration of microorganisms in the milk portion.

The first permeate was sterilized by heat treatment at 98° C. for 2 seconds followed by heat treatment at 65° C. for 2 minutes to form a treated milk portion. The cream portion was standardized and heat treated at 135° C. for 2 seconds to form a sterile cream. The sterile cream was added to the treated milk portion to form a milk product, which was homogenized and packaged for consumption.

As can be seen from the above Example, combining the second permeate with the milk portion prior to filtration by the first filter can reduce the concentration of microorganisms in the milk portion significantly. For example, if 5% of the combined milk portion is derived from the second permeate, the concentration of microorganisms in the combined milk portion for the above example will be 95,100,000/L (95% of 100,000,000/L+5% of 2,000,000/L), which is a reduction of 4,900,000/L or 4.9% in the concentration of microorganisms. More efficient filters can be used to reduce the number of microorganisms by an even larger factor.

While the invention has been described with reference to preferred embodiments and specific examples, it is to be understood that variations and modifications can be resorted to as will be apparent to those skilled in the art. Such variations and modifications are considered to be within the purview and scope of the invention as defined by the claims appended hereto.

What is claimed is:

1. A method of processing raw milk to produce a milk product having reduced microorganism content, the method comprising:

separating raw milk to form a skim milk portion and a cream portion;

filtering the skim milk portion through a first filter to form a first permeate and a first retentate;

filtering the first retentate through second filter to form a second permeate and a second retentate; and mixing the second permeate into one or more of the raw milk, the skim milk portion and the cream portion to produce a milk product having a reduced microorganism content.

2. The method of claim 1, including heating the first permeate to form a treated skim milk portion.

3. The method of claim 2, further comprising:

standardizing and heating the cream portion to form sterile cream; and remixing the sterile cream with the treated skim milk portion to form a milk product.

4. The method of claim 1, wherein the first filter has an effective pore size of about 0.5 μm or less and the effective pore size of the second filter is the same as or greater than that of the first filter.

5. The method of claim 4, wherein the second filter has an effective pore size of from about 0.5 μm to about 2.0 μm.

6. The method of claim 1, wherein the first filter comprises a plurality of separate filters in series, including conducting the permeate from each of the filters in the series to the next succeeding filter in the series, wherein the permeate of the last filter in the series forms the first permeate and the retentate of each of said separate filters is combined to form the first retentate.

7. The method of claim 1, wherein the first filter comprises a plurality of separate filters in series, each of said separate filters producing a retentate stream, the permeate of the last filter in the series forming the first permeate and wherein each of the retentate streams from said separate filters is fed to a corresponding retentate filter to form a second permeate and a second retentate, each of the second permeate streams is recirculated into the milk portion before the corresponding first filter.

8. The method of claim 4, wherein the first permeate is free of all heat resistant bacteria.

9. The method of claim 4, including heating the first permeate at a temperature of from about 90° C. to about 105° C. to form a treated milk portion.

10. The method of claim 1, wherein the effective pore size of the second filter is the same as or greater than that of the first filter.

11. The method of claim 1, wherein the second filter comprises a plurality of filters in series, the permeate from the last filter in the series forming the second permeate.

12. The method of claim 1, wherein the first filter has an effective pore size of about 0.3 μm or less and the effective pore size of the retentate filter is the same as or greater than that of the first filter.

13. The method of claim 12, further comprising heating the first permeate at a temperature of from about 72° C. to about 98° C. to form a treated skim milk portion.

14. The method of claim 12, wherein the first permeate is free of all heat resistant and thermoduric bacteria.

15. The method of claim 1, wherein the first filter comprises a plurality of separate filters in parallel, wherein the milk portion is divided into a plurality of streams each of which is fed to one of said separate filters to form a plurality of first permeate streams and first retentate streams, wherein the first permeate streams are combined to form the first permeate and the first retentate streams are combined to form the first retentate.

16. The method of claim 1, wherein the first filter comprises a plurality of separate filters in parallel, wherein the skim milk portion is divided into a plurality of streams each of which is fed to one of said separate filters to form first permeate streams and first retentate streams, wherein the first permeate streams are combined to form the first permeate and each of the first retentate streams is fed to a separate retentate filter to form second retentate streams and second permeate streams and each of the second permeate streams is mixed into the corresponding skim milk portion before the corresponding first filter.

17. The method of claim 3, further comprising homogenizing the milk product.

18. The method of claim 3, including packaging the milk product in containers.

19. The method of claim 18, including filling aseptic containers with the milk product.

20. The method of claim 1, wherein the second retentate comprises about 1% or less of the total amount of raw milk.

21. The method of claim 20, wherein the second retentate comprises about 0.5% or less of the total amount of raw milk.

22. The method of claim 21, wherein the second retentate comprises about 0.2% or less of the total amount of raw milk.

23. A method of processing a skim milk portion comprising:
   filtering the skim milk portion through at least one first filter to form a first permeate and a first retentate;
   filtering the first retentate through at least one retentate filter to form a second permeate and a second retentate; and
   mixing the second permeate into the skim milk portion prior to filtration by the first filter.

24. The method of claim 23, further comprising:
   homogenizing the second permeate before mixing with the skim milk portion.

25. A plant for treating milk comprising:
   a separating unit for separating raw milk into a cream portion and a skim milk portion;
   a standardization unit for the cream portion;
   a conduit for conducting the cream portion to the standardization unit;
   a conduit for conducting a standardized cream portion from the standardization unit to a heat treatment unit;
   a heat treatment unit for the standardized cream portion, the heat treatment unit for heating the cream portion sufficiently to sterilize the cream portion;
   a conduit for conducting the skim milk portion from the separation unit to a first microfiltration unit for separating the skim milk portion into a first retentate and a first permeate;
   a conduit for the first permeate;
   a conduit for the first retentate;
   a second microfiltration unit connected to the first retentate conduit for separating the first retentate into a second retentate and a second permeate; and
   a conduit for the second permeate, wherein the conduit for the second permeate allows the second permeate to be recirculated into one or more of the conduit for conducting the skim milk portion, a conduit for the raw milk, the conduits for conducting the cream portion, and the standardization unit for the cream portion.

26. The plant of claim 25 including:
   a uniting conduit uniting a conduit for the standardized cream portion and a conduit for the first permeate to form a standardized milk product;
   a heat treatment unit for the standardized milk product, the heat treatment unit for the standardized milk product adapted to sterilize the standardized milk product; and
   a conduit for the heat treated standardized milk product
   a homogenization unit for the standardized milk product;
   a conduit for the homogenized milk product; and
   a filling machine adapted to fill a container with the homogenized milk product.

27. The plant of claim 25 including:
   a heat treatment unit for the first permeate, the heat treatment unit for the first permeate adapted to sterilize the first permeate;
   a uniting conduit uniting the conduit for the standardized cream portion and a conduit for the heat treated first permeate to form a standardized milk product;
   a conduit for the standardized milk product;
   a homogenization unit for the standardized milk product;
   a conduit for the homogenized milk product; and
   a filling machine adapted to fill a container with the homogenized milk product.

28. The plant of claim 25, wherein the first microfiltration unit comprises a filtration medium having an effective pore size of 0.5 $\mu$m or less.

29. The plant of claim 25, wherein the first microfiltration unit comprises a first filtration medium having an effective pore size of 0.3 $\mu$m or less.

30. The plant of claim 25, wherein the first microfiltration unit comprises a first filtration medium and the second microfiltration unit comprises a second filtration medium, wherein the effective pore size of the second microfiltration medium is equal to or larger than that of the first microfiltration medium.

31. A plant for continuously supplying a heat-treated milk product, comprising:
   (a) a separator for separating raw milk into a cream portion and a skim milk portion;
   (b) a standardization unit for producing cream having a predetermined fat content;
   (c) a first filter having a pore size equal to or less than 0.5 $\mu$m;
   (d) a supply conduit for supplying the raw milk to the separator;
   (e) a first conduit for conveying the cream portion from the separator to the standardization unit;
   (f) a second conduit for conveying the skim milk portion from the separator to the first filter;
   (h) a third conduit for conveying a permeate from a first filter outlet to a first heat treatment unit for producing a first heat-treated milk product;
   (i) a fourth conduit for conveying the cream portion from the standardization unit to a second heat treatment unit for producing a heat-treated cream portion; and
   (j) a fifth conduit for supplying the cream portion from the second heat treatment unit to the third conduit for mixing the cream portion with the permeate from the first filter.

32. The plant according to claim 31, wherein the third and fifth conduits meet at a junction where the permeate from the first filter outlet and the cream portion from the second heat treatment unit are mixed, and the plant including:
   homogenizing apparatus in fluid communication with the mixed permeate and cream portion; and
   an apparatus for filling containers with homogenized milk product from the homogenizing apparatus.

* * * * *